United States Patent [19]

Ohmori

[11] Patent Number: 5,012,485

[45] Date of Patent: Apr. 30, 1991

[54] LASER BEAM SCANNING APPARATUS

[75] Inventor: Naoto Ohmori, Osaka, Japan

[73] Assignee: Minolta Camera Kabushiki Kaisha, Osaka, Japan

[21] Appl. No.: 404,956

[22] Filed: Sep. 8, 1989

[30] Foreign Application Priority Data

Sep. 10, 1988 [JP] Japan .................. 63-226961

[51] Int. Cl.$^5$ .............................. H01S 3/08
[52] U.S. Cl. ...................... 372/108; 372/24
[58] Field of Search .................... 346/108; 372/24

[56] References Cited

U.S. PATENT DOCUMENTS 4,731,623 3/1988 Oda et al. ................ 346/108
4,829,322 5/1989 Ohmori .................. 346/108

FOREIGN PATENT DOCUMENTS

58-93026 6/1983 Japan .
61-31141 1/1986 Japan .

Primary Examiner—Leon Scott, Jr.
Attorney, Agent, or Firm—Price, Gess & Ubell

[57] ABSTRACT

A laser beam scanning apparatus for beam scanning a medium with the laser beam being deflected by a deflector, comprising a first mirror provided for reflecting the laser beam after deflected by the deflector and a second mirror provided for folding a light path between the first mirror and the medium in such a relationship that a first light path between the deflector and the first mirror is not intersected with a second light path between the second mirror and the medium. The first and second mirrors are arranged so as to be movable in parallel respectively for adjusting a length of scanning line on the recording medium, wherein either one of the first and second mirrors is moved when adjusting and said moved mirror has a lesser shift amount of the scanning line on the recording medium in a direction perpendicular to the scanning line as compared with the other mirror.

4 Claims, 5 Drawing Sheets

LASER BEAM SCANNING APPARATUS

BACKGROUND OF THE INVENTION

1. Field of the Invention

The present invention relates to a laser beam scanning apparatus and, more specifically, to a laser beam scanning aPParatus in which a laser beam from a laser beam generating source is deflected by a deflector, whereby a recording medium is scanned and an image is formed thereon.

2. Description of the Prior Art

Generally, optical apparatuses for printers employing a laser beam for carrying image information such as shown in Japanese Laid-Open Patent Application Nos. SHO 61-3114 and SHO 58-93026 are well known. In optical apparatuses of the above-mentioned type, a distance between a deflector and a recording medium is determined by the width of an image, said distance being over 200 mm for A4 size in general. An image reflecting mirror is used for making such a long optical path compact. The elements constituting the optical apparatus should preferably be provided as a unit, so as to facilitate the positioning of the apparatus to the main body of the printer, to reduce vibration and to facilitate the care of the apparatus such as exchange of parts.

On the other hand, compared with an electrophotographic copying machine (plane paper copier) utilizing projected images of originals by visible light, higher image quality is required for a laser beam printer. Therefore, the optical apparatus is a critical portion dominating the image quality, and various portions thereof should be adjusted when assembled.

Especially, the adjustments of the length of scanning line, which is a length of a laser beam track on the recording medium as well as of an illuminating position on the recording medium are important. Examples of methods for adjusting the scanning line length include one wherein the entire optical unit is moved relative to the recording medium, and one wherein the image reflecting mirror is moved in the direction of a light axis and the like. Compared with the former method, the latter one facilitates the adjustment as a optical unit and is preferable in view of the structure as a unit.

However, the movement of the image reflecting mirror for adjusting the scanning line length causes a problem in that the illuminating position on the recording medium is interlockingly altered. The change of the illuminating position caused by adjusting the scanning line length becomes a problem in the case of adjusting the scanning line length after the adjustment of the illuminating position or adjusting the scanning line length with the illuminating position fixed.

SUMMARY OF THE INVENTION

A main object of the present invention is to provide a laser beam scanning apparatus wherein an amount of change of the illuminating position can be made within a permissible range relative to an amount of adjustment for a scanning line length.

This and other objects of the invention can be accomplished by providing a laser beam scanning apparatus for beam scanning a medium with the laser beam being deflected by a deflector, said apparatus comprising:

a first mirror provided for reflecting the laser beam after being deflected by the deflector;

a second mirror provided for folding a light path between the first mirror and the medium in such a relationship that a first light path between the deflector and the first mirror is not intersected with a second light path between the second mirror and the medium; and the first and second mirror; being arranged so as to fulfill the following conditions:

$$0 < \theta_1 < 45°$$

$$-\theta_1 < \theta_2 < 90° - 2\theta_1 < 90°,$$

where $\theta_1$ and $\theta_2$ represent angles between the mirror surfaces thereof and a plane perpendicular to a beam scanning plane from the deflector to the first mirror, and also to be movable in parallel, respectively, for adjusting a length of scanning line on the medium, wherein either one of the first and second mirrors is moved when adjusting and said moved mirror has lesser amount of the scanning line on the recording a medium in a direction perpendicular to the scanning line as compared with the other mirror.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

One embodiment of the present invention will be hereinafter described with reference to the figures.

Figure 1:
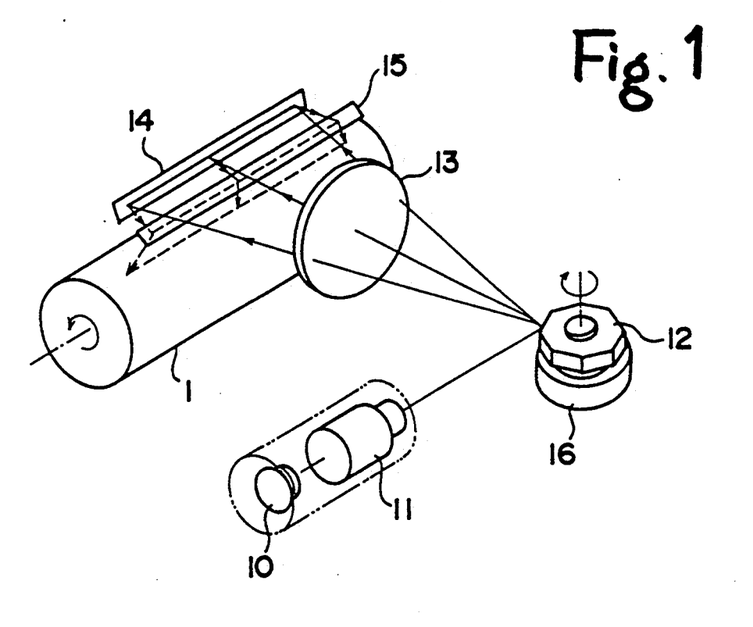
FIG. 1 is a perspective view showing the basic structure of an optical apparatus in accordance with the present invention.
Figure 2:
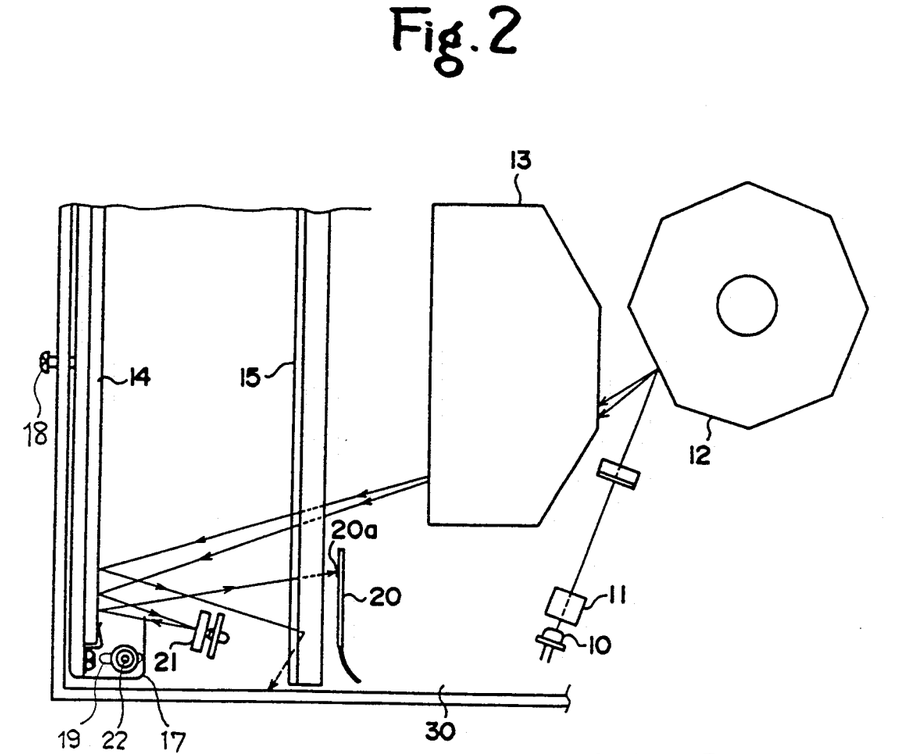
FIG. 2 is a plan view of the main portion of the optical apparatus.
Figure 3:
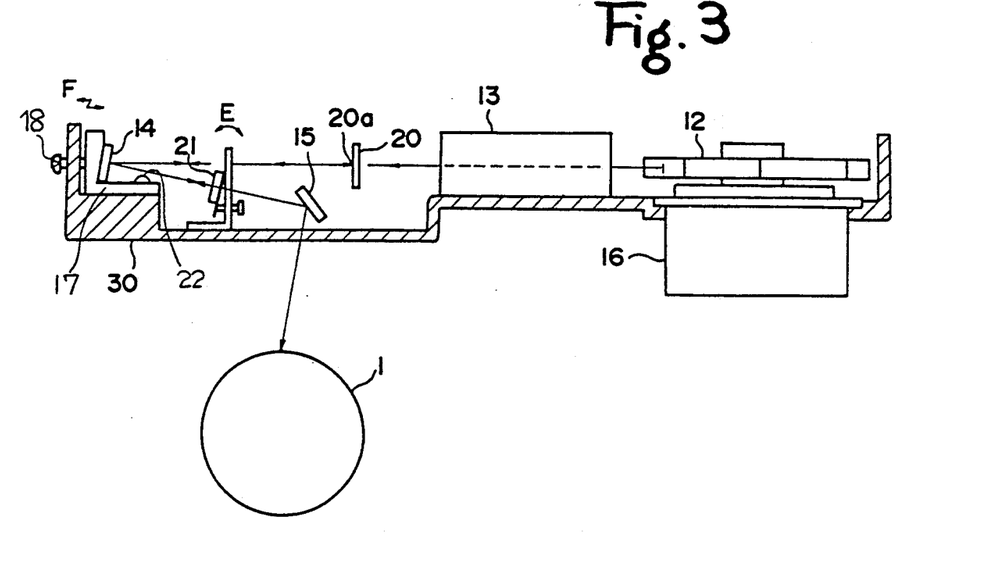
FIG. 3 is a vertical sectional view of FIG. 2.

In the present optical apparatus, a laser beam carrying image information irradiates a photoreceptor provided on a surface of a photoreceptor drum 1, whereby the drum is scanned by the laser beam in the axial direction of the drum 1. As shown in FIG. 1, the apparatus comprises a semiconductor laser 10, a collimator lens 11, a polygon mirror 12, a $f\theta$ lens 13, image reflecting mirrors 14 and 15 and a sensor for detecting a start position for image formation (hereinafter referred to as SOS sensor) 20, and mirror 21 used only for the sensor shown in FIGS. 2 and 3, and the apparatus is provided on a substrate 30 as a unit.

A laser beam emitted from the semiconductor laser 10 is made into a parallel light by the collimator lens 11 to be guided to a polygon mirror 12. The polygon mirror 12 is rotatively driven by a motor 16. By means of this rotation, the laser beam is deflected in the plane orthogonal to the axis of rotation. The defected laser beam is projected onto the photoreceptor drum 1 through the fθ lens 13 and the mirrors 14 and 15 to thereby be scanned on the drum 1. The fθ lens 13 equalizes the scanning speed of the laser beam on the drum 1 through beam scanning in association with the rotation of the polygon mirror 12.

The SOS sensor 20 compensates the error of the recording position for each scanning line derived from the division error of the deflection planes of the polygon mirror 12. In the SOS sensor 20, the laser beam reflected by the first image reflecting mirror 14 is reflected by the mirror 21 used only for the sensor, and thereafter, it is again reflected by the mirror 14 to enter the light receiving portion 20a of the SOS sensor 20. The light receiving portion 20a is located at a position equivalent to the image forming surface of the drum 1 in order to detect the start position of image formation in the main scanning direction. The incidental light to the light receiving portion 20a is adjusted by turning the inclination of the mirror 21 for the sensor in the direction of the arrow E.

Meanwhile, in the optical apparatus such as disclosed in the present invention, the distance between the polygon mirror 12 and the photoreceptor drum 1 becomes as long as 200 mm or more when the maximum image width is set at the letter size or the legal size. In view of the foregoing, in the present embodiment, the image light path is made compact and therefore the optical unit is made small by employing two image reflecting mirrors 14 and 15. As for the SOS light path, the light path is made compact and the optical unit is made small by reflecting the beam twice by the first image reflecting mirror 14.

Figure 4:
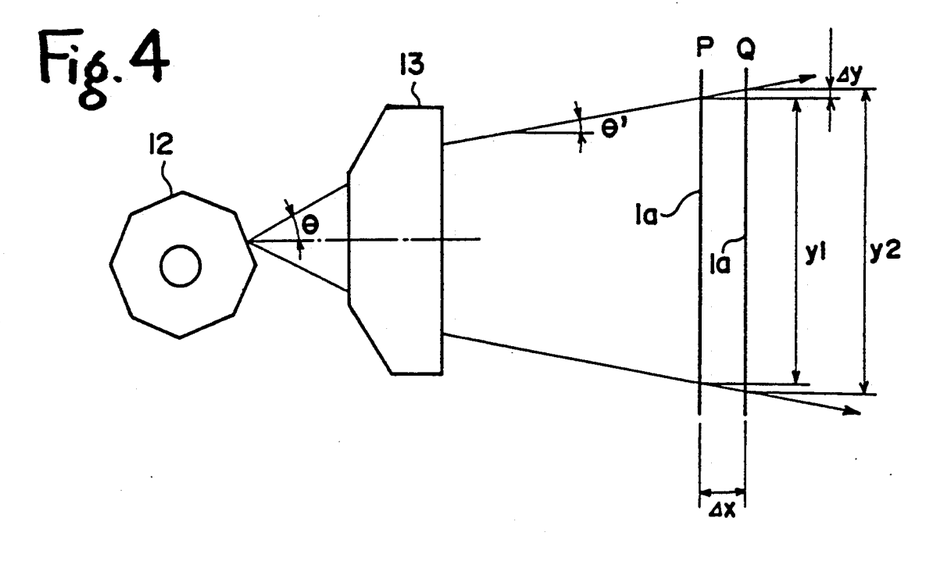
FIG. 4 is a schematic diagram illustrating the relation between the scanning line length, the point of focus and the angle of the beam.

FIG. 4 shows a basic light path of the optical system with the mirrors omitted therefrom. The beam deflected by the polygon mirror 12 by angle θ as maximum is turned by the fθ lens 13 in the direction θ'. Assuming that the initial equivalent position of the photoreceptor is P, the scanning width of the photoreceptor surface 1a will be y1 for the angle of deflection θ. On this equation, by moving the reflecting mirror 14 or 15 in parallel to the light path, the distance between the deflector (polygon mirror) and the equivalent surface of the photoreceptor is changed, whereby the scanning width (scanning line length) for the deflection angle θ is changed.

The first mirror 14 is supported by a supporter 17 which is shiftably provided to the substrate 30. By the manipulation of the screw 18, the supporter 17 is moved in parallel relative to the substrate 30 due to an elongated slit 19 and a screw 22.

The second mirror 15 has a similar construction to that of the first mirror as described above.

Now, assuming that the equivalent position to the photoreceptor moves from P to Q by the distance Δx by the movement of the reflecting mirror 14 or 15, the following equation is satisfied.

$$y^2 - y^1 = 2\Delta y = 2\Delta x \cdot \tan\theta' \ldots \quad (1)$$

As described above, the scanning line length can be adjusted by moving the mirror 14 or 15, which accompanies the change of the position (an illuminating position) where the laser beam reaches the photoreceptor drum in a direction orthogonal to the drum axis. This change will appeared on the image as the change of the start position for image formation.

Hereinafter explained is the changes of the length of the light path and the illuminating position in the apparatus constructed such that a light reflected by the second mirror does not intersect the light path from the polygon mirror 12 to the first mirror 14 by using two mirrors 14 and 15.

Figure 5:
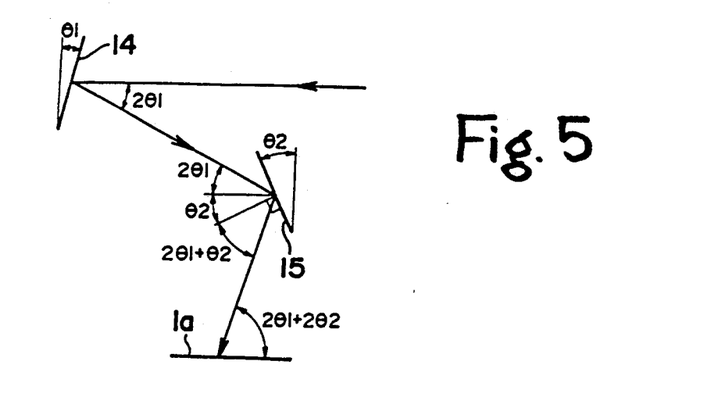
FIG. 5 is explanatory view illustrating angular relation of the beam reflected by first and second mirrors.

Referring to FIG. 5, the laser beam from fθ lens 13 is reflected by the first mirror 14 which is inclined by an angle $\theta_1$ in the clockwise direction from a plane orthogonal to the beam scanning plane, and the beam further is reflected by the second mirror 15 which inclines by an angle $\theta_2$ in the counter-clockwise direction from the plane orthogonal to the beam scanning plane (angle $-\theta_2$ in the clockwise direction) to thereby reach the photoreceptor surface 1a. in this case, a reflecting angle of the first mirror 14 becomes $2\theta_1$, a reflecting angle of the second mirror 15 becomes $$2\theta_1 + \theta_2 + 2\theta_1 + \theta_2 = 4\theta_1 + 2\theta_2,$$

and an incident angle to the photoreceptor surface 1a becomes $2\theta_1 + 2\theta_2$.

Figure 6A:
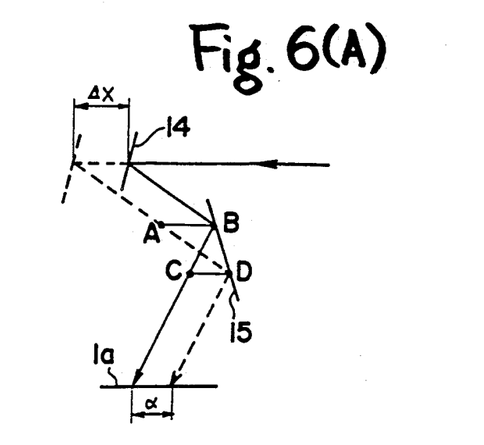
FIGS. 6(A) and (B) are explanatory views illustrating the change of a light path when a first mirror is moved.
Figure 6B:
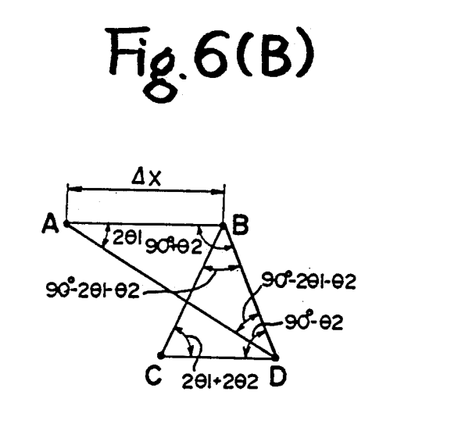

As shown in FIGS. 6(A) and 6(B), in the case where the first mirror 14 is moved leftwardly from the position shown by a solid line to the position shown by a chain line by the distance ΔX in FIG. 6(A), the amount of change of the light path Δ1, i.e., the amount of change of the scanning line length is represented as follows:

$$\Delta 1 = \Delta X + \overline{AD} - \overline{BC} \ldots \quad (2)$$

Since the angles of inclination of the mirrors 14 and 15 to the subscanning direction are defined as $\theta_1$ and $\theta_2$ respectively, the following equations can be composed from the triangle ΔADB $$\frac{\overline{AD}}{\sin(90° + \theta_2)} = \frac{\overline{AB}(=\Delta X)}{\sin(90° - 2\theta_1 - \theta_2)} = \frac{\overline{BD}}{\sin 2\theta_1}$$

$$AD = \Delta X \cdot \cos\theta_2 / \cos(2\theta_1 + \theta_2) \quad (3)$$
$$BD = \Delta X \cdot \sin 2\theta_1 / \cos(2\theta_1 + \theta_2) \quad (4)$$

From the triangle ΔBCD, $$\frac{\overline{BC}}{\sin(90° - \theta_2)} = \frac{\overline{BD}}{\sin(2\theta_1 + 2\theta_2)} = \frac{\overline{CD}}{\sin(90° - 2\theta_1 - \theta_2)}$$

$$\overline{BC} = \overline{BD} \cdot \cos\theta_2 / \sin(2\theta_1 + 2\theta_2) \quad (5)$$

$$= \frac{\Delta X \cdot \sin 2\theta_1}{\cos(2\theta_1 + \theta_2)} \times \frac{\cos\theta_2}{\sin(2\theta_1 + 2\theta_2)}$$

$$\overline{AB} = \Delta X \quad (6)$$

The amount of change of the scanning line length is obtained from the equations (2), (3) and (5):

$$\Delta 1 = \Delta X + \overline{AD} - \overline{BC} \quad (7)$$

$$= \Delta X \left( 1 - \frac{\cos\theta_2}{\cos(2\theta_1 + \theta_2)} - \frac{\sin 2\theta_1 \cdot \cos\theta_2}{\cos(2\theta_1 + \theta_2) \cdot \sin(2\theta_1 + 2\theta_2)} \right)$$

-continued $$= \Delta X \left[ 1 + \frac{\cos\theta_2\{\sin(2\theta_1 + \theta_2) - \sin 2\theta_1\}}{\cos(2\theta_1 + \theta_2) \cdot \sin(2\theta_1 + 2\theta_2)} \right]$$

$$= \Delta X \left[ 1 + \frac{\cos\theta_2 \cdot 2\cos(2\theta_1 + \theta_2) \cdot \sin\theta_2}{\cos(2\theta_1 + \theta_2) \cdot \sin(2\theta_1 + 2\theta_2)} \right]$$

$$= \frac{\Delta X}{\sin(2\theta_1 + 2\theta_2)} \{\sin(2\theta_1 + 2\theta_2) + \sin 2\theta_2\}$$

$$\Delta 1 = \Delta X \cdot \frac{2\sin(\theta_1 + 2\theta)\cos\theta_1}{\sin(2\theta_1 + 2\theta_2)}$$

On the other hand, the amount of change $\alpha$ of the illuminating position is represented as follows:

$$\alpha = \overline{CD} \tag{8}$$

$$= \overline{BD} \cdot \cos(2\theta_1 + \theta_2)/\sin(2\theta_1 + 2\theta_2)$$

$$= \frac{\Delta X \cdot \sin 2\theta_1}{\cos(2\theta_1 + \theta_2)} \times \frac{\cos(2\theta_1 + \theta_2)}{\sin(2\theta_1 + 2\theta_2)}$$

$$= \Delta X \cdot \sin 2\theta_1/\sin(2\theta_1 + 2\theta_2)$$

Figure 7A:
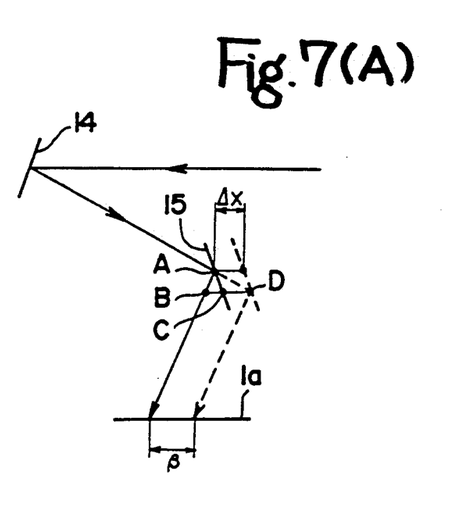
FIGS. 7(A) and (B) are an explanatory views illustrating the change of a light path when a second mirror is moved.
Figure 7B:
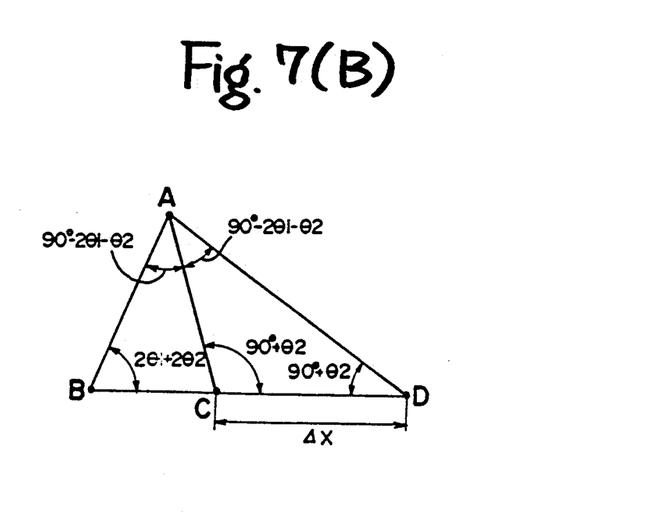

Next, the amount of change $\Delta 2$ of the light path is represented as follows in the case where the second mirror 15 is moved rightwardly from the position shown by a solid line to the position shown by a chain line by the distance $\Delta X$ in FIGS. 7(A) and 7(B):

$$\Delta 2 = \overline{AD} - \overline{AB} \tag{9}$$

$$= \frac{\Delta X \cdot \cos\theta_2}{\cos(2\theta_1 + \theta_2)} - \frac{\overline{AD} \cdot \sin 2\theta_1}{\sin(2\theta_1 + 2\theta_2)}$$

$$= \frac{\Delta X \cdot \cos\theta_2}{\cos(2\theta_1 + \theta_2)} - \left\{ \frac{\Delta X \cdot \cos\theta_2}{\cos(2\theta_1 + \theta_2)} \times \frac{\sin 2\theta_1}{\sin(2\theta_1 + 2\theta_2)} \right\}$$

$$= \frac{\Delta X \cdot \cos\theta_2}{\cos(2\theta_1 + \theta_2) \cdot \sin(2\theta_1 + 2\theta_2)} \times 2\cos(2\theta_1 + \theta_2) \cdot \sin\theta_2$$

$$= \frac{\Delta X \cdot \sin 2\theta_2}{\sin(2\theta_1 + 2\theta_2)}$$

On the other hand, the amount of change $\beta$ of the illuminating position is represented as follows:

$$\beta = \overline{BD} \tag{10}$$

$$= \frac{\overline{AD} \cdot \sin 2(\theta_1 + \theta_2)}{\sin(2\theta_1 + 2\theta_2)}$$

$$= \frac{\Delta X \cdot \cos\theta_2}{\cos(2\theta_1 + \theta_2)} \times \frac{\sin 2(\theta_1 + \theta_2)}{\sin(2\theta_1 + 2\theta_2)}$$

$$= \frac{\Delta X \cdot 2\cos\theta_2 \cdot \sin(2\theta_1 + \theta_2)}{\sin(2\theta_1 + 2\theta_2)}$$

Each of the amounts of change mentioned above are shown in Table 1.

TABLE 1

| | amount of change of the light path | amount of change of the illuminating position |
|---|---|---|
| movement of the mirror 14 | $\Delta 1 = \dfrac{2\Delta X \cdot \sin(\theta_1 + 2\theta_2) \cdot \cos\theta_1}{\sin(2\theta_1 + 2\theta_2)}$ | $\alpha = \dfrac{\Delta X \cdot \sin 2\theta_1}{\sin(2\theta_1 + 2\theta_2)}$ |
| movement of the mirror 15 | $\Delta 2 = \dfrac{\Delta X \cdot \sin 2\theta_2}{\sin(2\theta_1 + 2\theta_2)}$ | $\beta = \dfrac{2\Delta X \cdot \cos\theta_2 \cdot \sin(2\theta_1 + \theta_2)}{\sin(2\theta_1 + 2\theta_2)}$ |

The change rates of the illuminating position relative to the change of the light path are defined by the following equations wherein PM1 represents the change rate with regard to the movement of the first mirror 14 and PM2 represents the change rate with regard to the movement of the second mirror 15.

$$PM1 = \frac{\alpha}{\Delta 1} = \frac{\sin 2\theta_1}{2\sin(\theta_1 + 2\theta_2) \cdot \cos\theta_1} \tag{11}$$

$$= \sin\theta_1/\sin(\theta_1 + 2\theta_2)$$

$$PM2 = \frac{\beta}{\Delta 2} = \frac{2\cos\theta_2 \cdot \sin(2\theta_1 + \theta_2)}{\sin 2\theta_2} \tag{12}$$

$$= \sin(2\theta_1 + \theta_2)/\sin\theta_2$$

If the ratio of these change rates is defined as $\gamma$, $$\gamma = PM1/PM2 \tag{13}$$

$$= \frac{\sin\theta_1 \cdot \sin\theta_2}{\sin(\theta_1 + 2\theta_2) \cdot \sin(2\theta_1 + \theta_2)}$$

In the case where the ratio $\gamma$ is more than "1", the movement of the first mirror 14 gives a greater amount of change of the illuminating position relative to the amount of change of the light path compared with the amount obtained by the movement of the second mirror 15.

The ratio $\gamma$ of less than "1" brings the reverse result.

Next, there is explained the conditions required to the optical apparatus of the present invention where the first and second mirror 14 and 15 are inclined by $\theta_1$ and $-\theta_2$ in the clockwise direction and a first light path between the polygon mirror 12 and the first mirror 14 does not intersected with a second light path between the second mirror 15 and the photoreceptor 1. From FIG. 5, $$0° < 2\theta_1 < 90°, \text{ namely, } 0° < \theta_1 < 45° \ldots \tag{14}$$

$$0° < 4\theta_1 + 2\theta_2 < 180°, \text{ namely, } 0° < 2\theta_1 + \theta_2 < 90° \ldots \tag{15}$$

$$0° < 2\theta_1 2\theta_2 < 180°, \text{ namely, } 0° < \theta_1 + \theta_2 < 90° \ldots \tag{16}$$

Figure 8:
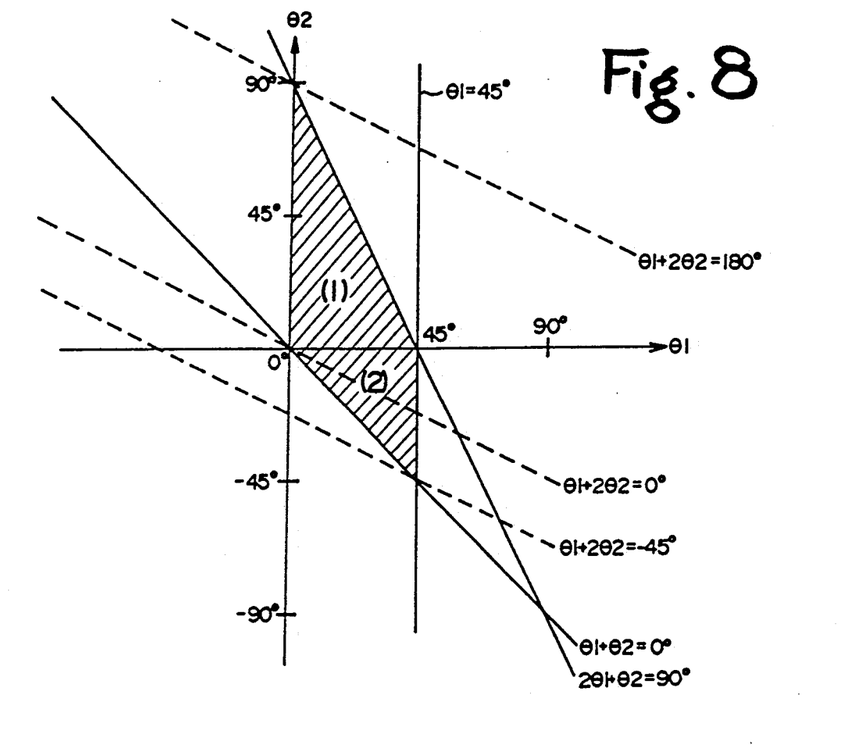
FIGS. 8 to 12 are graphs showing relations between angles $\theta_1$ and $\theta_2$.

A range fulfilling the conditions (14) to (16) is shown by a hatch portion in FIG. 8 of which abscissa and ordinate are $\theta_1$ and $\theta_2$ respectively.

From the conditions (15) and (16), $$0° < \theta_1 + \theta_2 < 2\theta_1 + \theta_2 < 90°$$

is introduced. This condition is transformed to the next condition (17) by subtracting $\theta_1$ and $2\theta_1$, respectively, from this condition.

$$-\theta_1 < \theta_2 < 90° - 2\theta_1 < 90° \ldots \tag{17}$$

Consequently, the conditions required to the aforementioned optical apparatus are summarized into the conditions (14) and (17).

With respect to the term $(\theta_1 + 2\theta_2)$, a following condition (18) is introduced from the hatching range of FIG. 8.

$$-45° < \theta_1 + 2\theta_2 < 180°... \quad (18)$$

In the meantime, the ratio $\gamma$ will be evaluated hereafter separately for an area (1) where $0° < \theta_2 < 90°$ and an area (2) where $\theta_2 < 0°$.

It is noted that the area (1) fulfills conditions $0° < \theta_1 < 45°$, $0° < \theta_2 < 90°$, $2\theta_1 + \theta_2 90°$. To evaluate the ratio $\gamma$, the area (1) is further divided into three areas (1a), (1b) and (1c) as shown more precisely in FIG. 9.

$$0° \theta_1 + 2\theta_2 \leq 90°... \quad \text{area (1a)}$$

$$90° < \theta_1 + 2\theta_2 \leq 135°... \quad \text{area (1b)}$$

$$135° < \theta_1 + 2\theta_2 \leq 180°... \quad \text{area (1c)}$$

Area (1a)

Figure 9:
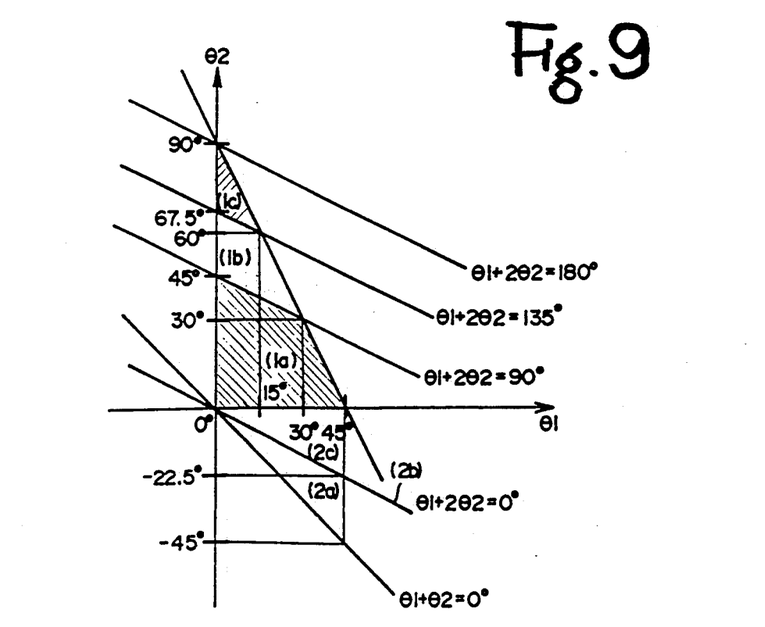

From the condition of the area (1a) and relations $0° < \theta_1 < 45°$ and $0° < \theta_2 < \ldots°$ which are known from FIG. 9, obtained is $$\sin\theta_1 < \sin(\theta_1 + 2\theta_1).$$

it is determined for PM1 from the above condition and the equation (11) that:

$$0 < PM1 < 1.$$

On the other hand, it is determined for PM2 from the equation (12) and relation $$\sin\theta_2 < \sin(2\theta_1 + \theta_2),$$

which is introduced the condition (15), that:

$$PM2 > 1.$$

As a result, there is realized at the area (1a)

$$0 < \gamma < 1.$$

Area (1b)

It is known from FIG. 9 that $0° < \theta_1 < 30°$, $30° < \theta_2 < 67.5°$. Further from the condition of the area (1b), $$90° < \theta_1 + 2\theta_2 \leq 135°$$

$$45° \leq 180° - (\theta_1 + 2\theta_2) < 90°$$

$$0° < \theta_1 30° < 45° \leq 180° - (\theta_1 + 2\theta_2) < 90°,$$

obtained is $$\sin\theta_1 < \sin\{180° - (\theta_1 + 2\theta_2)\} = \sin(\theta_1 + 2\theta_2).$$

It is therefore determined for PM1 from the above condition and the equation (11) that $$0 < PM1 < 1.$$

On the other hand, the amount of PM2 is more than 1 (PM2>1) as same as the area (1a), so that there is realized at the area (1b)

$$0 < \gamma < 1.$$

Area (1c)

It is known from FIG. 9 that $0° < \theta_1 < 15°$, $60° < \theta_2 < 90°$. The amount of PM2 is more than 1 (PM2>1) as same as the areas (1a) and (1b).

The amount of PM1 can not be determined from the angular relations $0° < \theta_1 15°$, $135° < \theta_1 + 2\theta_1 \leq 180°$, so than another method is used where $\theta_1$ is compared with $\{180° - (\theta_1 + 2\theta_2)\}$. From the condition of the area (1c), $$\theta_1 - \{180° - (\theta_1 + 2\theta_2)\} = 2\theta_1 + 2\theta_2 - 180° < 0°.$$

Therefore, $$\theta_1 < 180° - (\theta_1 + 2\theta_2)$$

$$\sin\theta_1 < \sin(\theta_1 + 2\theta_2)$$

It is determined for PM1 that:

$$0 < PM1 < 1,$$

so that there is realized $$0 < \gamma < 1.$$

At the boundary between the areas (1) and (2) where $\theta_2 = 0°$, the amount of PM2 is infinity (PM2=$\infty$). Accordingly, the light path can not be changed by moving the second mirror 15.

Next, the ratio $\gamma$ will be evaluated with regard to the area (2) where $0° < \theta_1 < 45°$, $-45° < \theta_2 < 0°$, $\theta_1 + \theta_2 > 0°$, and $0° < 2\theta_1 + \theta_2 < 90°$, $-45° < \theta_1 + 2\theta_2 < 45°$. To evaluate the ratio $\gamma$, the area (2) is further divided into three areas (2a), (2b) and (2c) as shown in FIG. 9 more precisely.

$$-45° < \theta_1 + 2\theta_2 < 0°... \quad \text{area (2a)}$$

$$(-45° < \theta_2 < 0°)$$

$$\theta_1 + 2\theta_2 = 0°... \quad \text{area (2b)}$$

$$0° < \theta_1 + 2\theta_2 < 45°... \quad \text{area (2c)}$$

$$(-22.5° < \theta_2 < 0°)$$

Area (2b)

The area (2b) has an amount PM1=$\infty$ and accordingly $\gamma$ is infinity ($\gamma = \infty$), that means there cannot be any change of the light path length by moving the first mirror 14.

Areas (2a) and (2c)

From FIGS. 8 and 9, the conditions $2\theta_1 + \theta_2 > 0°$, $\theta_2 < 0°$ are fulfilled at the areas (2a) and (2c).

To evaluate the ratio $\gamma$, a first method is used where $(2\theta_1 + \theta_2)$ is compared with $(-\theta_2)$.

$$2\theta_1 + \theta_2 - (-\theta_2) = 2\theta_1 + 2\theta_2 > 0°$$

$$2\theta_1 + \theta_2 > -\theta_2 > 0°$$

$$\sin(2\theta_1 + \theta_2) > \sin(-\theta_2) > 0°$$

$$\{\sin(2\theta_1 + \theta_2)/\sin(-\theta_2)\} > 1$$

PM2 > 1

It is therefore determined for the areas (2a) and (2c) that:

$$PM2 < -1 \ldots \quad (21)$$

For PM1 in the area (2a), ($\theta_1$) is compared with $\{-(\theta_1+2\theta_2)\}$.

$$\theta_1 - \{-(\theta_1+2\theta_2)\} = 2\theta_1 + 2\theta_2 > 0°$$

Therefore,
$$PM1 < -1 \ldots \quad (22)$$

For PM1 in the area (2c), ($\theta_1$) is compared with ($\theta_1+2\theta_2$).

$$(\theta_1 - (\theta_1+2\theta_2) + -2\theta_2 > 0°$$

$$\{\sin\theta_1/\sin(\theta_1+2\theta_2)\} > 1$$

Therefore,
$$PM1 > 1 \ldots \quad (23)$$

As apparent from the conditions (21), (22), (23), it is impossible to determine whether or not the ratio $|\gamma|$ is larger than 1.

Next, a second method is used where combinations of terms included in the numerator and denominator of $\gamma$ are estimated. The term combinations other than the term combinations of PM1 and PM2 are as follows:

$$\sin\theta_1/\sin(2\theta_1+\theta_2) \ldots \quad (24)$$

$$\sin\theta_2/\sin(\theta_1+2\theta_2) \ldots \quad (25)$$

From the relation $\theta_1 > 0°$, $2\theta_1+\theta_2 > 0°$, $$(2\theta_1+\theta_2) - (\theta_1) = \theta_1+\theta_2 > 0°$$

$$0° < \theta_1 < 2\theta_1+\theta_2 < 90°$$

$$0° < \sin\theta_1 < \sin(2\theta_1+\theta_2)$$

The expression (24) is therefore less than 1, namely, $$\sin\theta_1/\sin(2_1+\theta_2) < 1 \ldots \quad (24')$$

For the expression (25), ($-\theta_2$) is compared with $\{(\theta_1+2\theta_2)\}$ with respect to the area (2a).

$$(-\theta_2) - \{-(\theta_1+2\theta_2)\} = \theta_1+\theta_2 > 0° \quad (25')$$
$$45° > -\theta_2 > -(\theta_1+2\theta_2) > 0°$$
$$\sin(-\theta_1) > \sin\{-(\theta_1+2\theta_2)\} > 0°$$
$$\{\sin(-\theta_2)/\sin\{-(\theta_1+2\theta_2)\} > 1$$
$$\sin\theta_2/\sin(\theta_1+2\theta_2) > 1$$

As apparent from the expressions (24') (25'), it is impossible to determine the value of the ratio $\gamma$ at the area (2a) by use of the second method.

With respect to the area (2c), ($-\theta_2$) is compared with ($\theta_1+2\theta_2$).

$$(-\theta_2) - (\theta_1+2\theta_2) = -(\theta_1+3\theta_2)$$

If ($\theta_1+3\theta_2$) is equal to or more than 0°, $$0° < -\theta_2 \leq \theta_1 2\theta_2 < 45°,$$

so that the expression (24) becomes equal to or less than 1, namely, $$|\sin(-\theta_2)/\sin(\theta_1+2\theta_2)| \leq 1.$$

Figure 10:
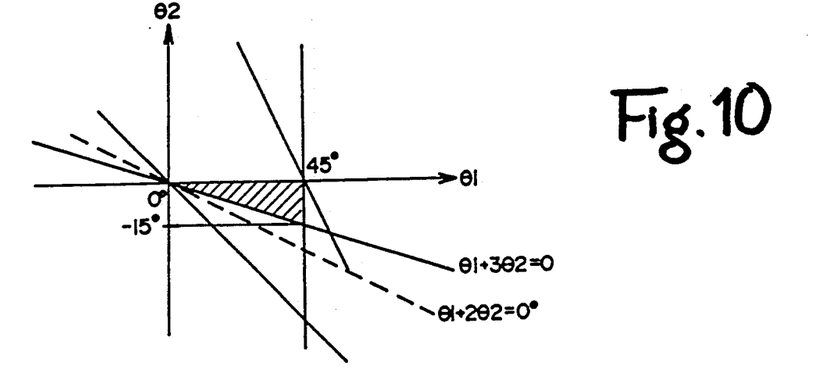

Therefore, the absolute value of the ratio $\gamma$ becomes less than 1, namely, $$|\gamma| < 1,$$

when $\theta_1+3\theta_2 \geq 0$ which is shown in FIG. 10 by the hatch portion.

Or the contrary, if ($\theta_1+3\theta_2$) is negative, it is impossible to determine the value of the ratio $\gamma$.

Third method is attempted to evaluate the value of the ratio $\gamma$. The third method uses the following equation which obtained from the equations (11) and (12):

$$PM1 - PM2 = \frac{\sin\theta_1 \cdot \sin\theta_2 - \sin(\theta_1 + 2\theta_2) \cdot \sin(2\theta_1 + \theta_2)}{\sin(\theta_1 + 2\theta_2)\sin\theta_2} \quad (26)$$

The numerator of the equation (26) is transformed as follows:

$$\sin\theta_1 \cdot \sin\theta_2 - \sin(\theta_1 + 2\theta_2) \cdot \sin(2\theta_1 + \theta_2) \quad (27)$$
$$= -\tfrac{1}{2}\{\cos(\theta_1 + \theta_2) - \cos(\theta_1 - \theta_2)\} -$$
$$[\tfrac{1}{2}\{\cos3(\theta_1 + \theta_2) - \cos(\theta_1 - \theta_2)]$$
$$= \tfrac{1}{2}\{\cos3(\theta_1 + \theta_2) - \cos(\theta_1 + \theta_2)\}$$

Figure 11:
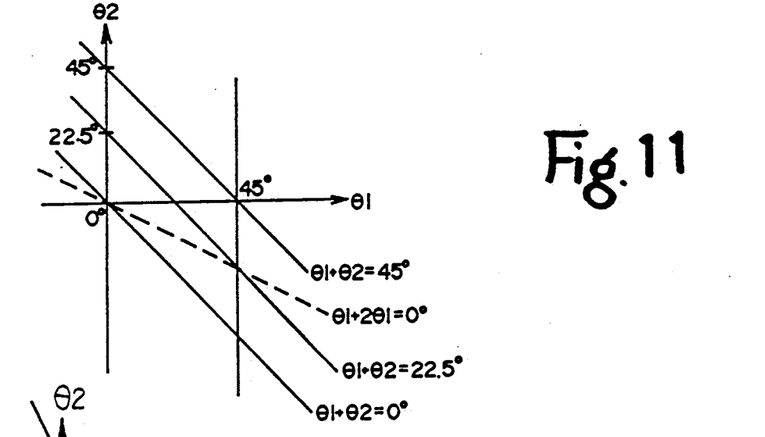

The area (2a) has a condition $\theta_1+2\theta_2 < 0°$, $\theta_1 > 0°$ and therefore PM1 $< -1$ and PM2 $< -1$. Further, the area (2a) has a condition, $$0° < \theta_1+\theta° < 22.5°,$$

which is known from FIG. 11.

$$0 < \theta_1+\theta_2 < 3(\theta_1+\theta_2) < 67.5°$$

$$\cos(\theta_1+\theta_2) > \cos3(\theta_1+\theta_2)$$

Accordingly, the numerator of [PM1−PM2] < 0.

On the other hand, the denominator of (PM1−PM2) is positive since ($\theta_1 2\theta_2$) and ($\theta_2$) are both negative. Therefore, the following relation is introduced:

$$PM1 - PM2 < 0$$

$$PM1 < PM2 < 0$$

$$\gamma = (PM1/PM2) > 1 \ldots \quad (28)$$

On the contrary, it is imPossible for the area (2c) to determine the value of the ratio $\gamma$ by using the third method, because of the impossible of the transformation of an expression (PM1+PM2) which is required to evaluate the ratio $\gamma$.

The evaluation result up to the present is made up into the following table 2 for the optical apparatus fulfilling the conditions (14) and (17).

TABLE 2

| | PM1 | PM2 | $\gamma$ |
|---|---|---|---|
| $\theta_2 > 0°$ | 0 < PM1 < 1 | PM2 > 1 | 0 < $\gamma$ < 1 |
| $\theta_2 = 0°$ | 1 | PM2 = $\infty$ | $\gamma$ = 0 |
| $\theta_2 < 0°$ | | | |
| $\theta_1 + 3\theta_2 \geq 0°$ | PM1 > 1 | PM2 < −1 | −1 < $\gamma$ < 0 |
| $\theta_1 + 3\theta_2 < 0°$ | PM1 > 1 | PM2 < −1 | indeterminable |
| $\theta_1 + 2\theta_2 > 0°$ | | | |
| $\theta_1 + 2\theta_2 = 0°$ | PM1 = $\infty$ | — | $\gamma$ = $\infty$ |

TABLE 2-continued

| | PM1 | PM2 | $\gamma$ |
|---|---|---|---|
| $\theta_1 + 2\theta_2 < 0°$ | PM1 < −1 | PM2 < −1 | $\gamma > 1$ |

Figure 12:
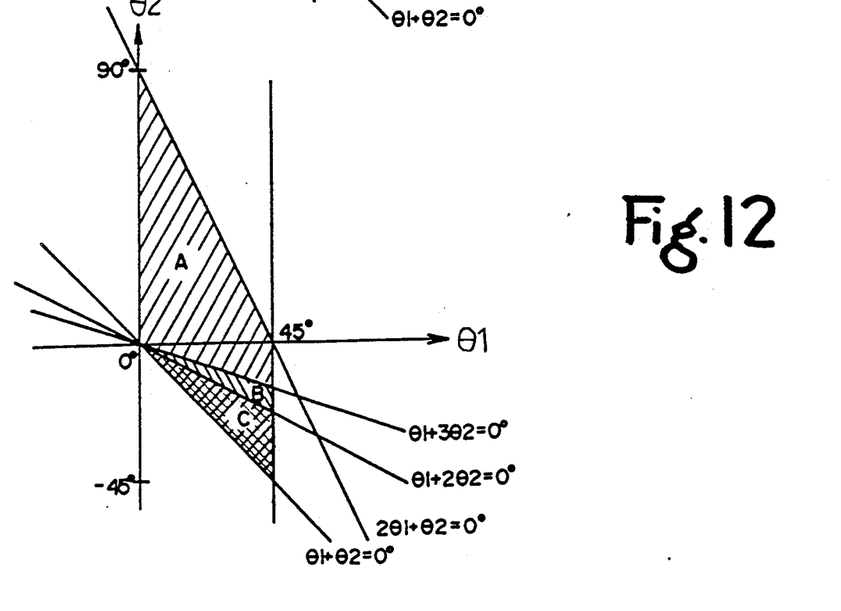

As apparent from the table 2, the ratio is classified into three regions A, B and C as shown in FIG. 12.

The region A is denoted by the right-inclined hatching and fulfills the condition $\theta_1 + 3\theta_2 \geq 0°$ in addition to the conditions (14) and (17). In the region A, the first mirror 14 is moved for adjusting the scanning line length to thereby obtain smaller aberration of the illuminating position than a case where the second mirror 15 is moved.

The region C is denoted by cross-hatching and fulfills the condition $\theta_1 + 2\theta_2 \leq 0°$ in addition to the conditions (14) and (17). In the region C the second mirror 15 is moved for adjusting the scanning line length to thereby obtain smaller aberration of the illuminating position than moving the first mirror 14.

In the region B denoted by left-inclined hatching and having the conditions $\theta_1 + 2\theta_2 > 0$) and $\theta_1 + 3\theta_2 < 0°$, it is indeterminable that either the first or second mirror is to be moved for adjustment, so that the scanning line length is adjusted by a manner of trial and error.

As apparent from the above, the apparatus according to the present invention affords a lesser shift amount of the illuminating position on the recording medium when the scanning line length is adjusted by moving the first or second mirror.

Although the present invention has been fully described by wa of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A laser beam scanning apparatus for beam scanning a medium with a laser beam being deflected by a deflector, comprising:
   a first mirror provided with a surface for reflecting the laser beam, after being deflected by the deflector along a first light path;
   a second mirror with a surface provided for reflecting the laser beam from the first mirror for folding a light path between the first mirror and the medium in such a relationship that the first light path between the deflector and the first mirror is not intersected with a second light path between the second mirror and the medium, and
   the first and second mirrors being positioned so as to fulfill the following conditions:

$$0 < \theta_1 < 45°$$

$$-\theta_1 < \theta_2 < 90° - 2\theta_1 < 90°$$

where $\theta_1$ and $\theta_2$ represent angles between respectively the first and second mirror surfaces thereof and a plane perpendicular to a beam scanning plane from the deflector to the first mirror,
   the first and second mirrors are movable, respectively, for adjusting a length of a scanning line on the medium, wherein when one of the first and second mirrors is moved during adjusting, said moved mirror has a lesser shift amount of the scanning line on the medium in a direction perpendicular to the scanning line as compared with a movement of the other mirror.

2. A laser beam scanning apparatus as claimed in claim 1, wherein the first mirror is moved for adjusting the length of scanning line when (PM1/PM2) < 1 and the second mirror is moved for adjusting the length of scanning line when (PM1/PM2) < 1, where PM1 represents the change rate of the shift amount of the scanning line with regard to the movement of the first mirror and PM2 represents the change rate of the shift amount of the scanning line with regard to the movement of the second mirror.

3. In a laser beam scanning apparatus for beam scanning a medium with a laser beam being deflected by a deflector through mirrors, a method for providing specific positional relationship to the mirrors for adjusting as scanning line comprising in steps for;
   providing a first mirror for deflecting the laser beam after deflection by the deflector and the second mirror for reflecting the laser beam from the first mirror for folding a light path between the first mirror and the medium;
   arranging the first and second mirrors in such a relationship that a first light path between the deflector and the first mirror is not intersected with a second light path between the second mirror and the medium and that the following conditions are fulfilled:

$$0 < \theta_1 < 45°$$

$$-\theta_1 < \theta_2 < 90° - \theta_1 < 90°$$

where $\theta_1$ and $\theta_2$ represent angles between the mirror surfaces thereof and a plane perpendicular to a beam scanning plane from the deflector to the first mirror; and
   moving either one of the first and second mirrors in order to adjust a length of scanning line on the medium in such a manner that said moved mirror has a lesser shift amount of the scanning line on the medium in a direction perpendicular to the scanning line as compared with the other mirror.

4. A method for providing positional relationship to the mirrors as claimed in claim 3, wherein the first mirror is moved for adjusting the length of scanning line when (PM1/PM2) < 1 and the second mirror is moved for adjusting the length of scanning line when (PM1/PM2) > 1, where PM1 represents the change rate of the shift amount of the scanning line with regard to the movement of the first mirror and PM2 represents the change rate of the shift amount of the scanning line with regard to the movement of the second mirror.

* * * * *